United States Patent
Ranzini et al.

(10) Patent No.: US 7,343,349 B2
(45) Date of Patent: Mar. 11, 2008

(54) SYSTEM AND METHOD FOR SECURE DATA AND FUNDS TRANSFER

(75) Inventors: Stephen Lange Ranzini, Ann Arbor, MI (US); Chris J. Weiderman, Ypsilanti, MI (US); Don L. Jacobs, Oak Park, MI (US)

(73) Assignee: Jove Corporation, Berkley, MI (US)

( * ) Notice: Subject to any disclaimer, the term of this patent is extended or adjusted under 35 U.S.C. 154(b) by 16 days.

(21) Appl. No.: 09/981,358

(22) Filed: Oct. 15, 2001

(65) Prior Publication Data

US 2002/0065784 A1    May 30, 2002

Related U.S. Application Data

(63) Continuation-in-part of application No. 09/501,874, filed on Feb. 10, 2000, now Pat. No. 7,120,606.

(51) Int. Cl.
*G06F 17/60* (2006.01)
(52) U.S. Cl. .............. 705/64; 705/57; 713/186
(58) Field of Classification Search ............ 705/35, 705/80, 57, 58, 50, 51, 64; 713/176, 188; 380/201, 202
See application file for complete search history.

(56) References Cited

U.S. PATENT DOCUMENTS

| | | | | |
|---|---|---|---|---|
| 4,731,842 A | | 3/1988 | Smith ............................ 380/24 |
| 5,371,797 A | * | 12/1994 | Bocinsky, Jr. ................ 705/70 |
| 5,963,647 A | | 10/1999 | Downing et al. .............. 380/24 |
| 6,047,887 A | * | 4/2000 | Rosen .......................... 235/379 |
| 6,427,140 B1 | * | 7/2002 | Ginter et al. .................. 705/80 |
| 6,574,609 B1 | * | 6/2003 | Downs et al. ................. 705/50 |
| 7,120,606 B1 | * | 10/2006 | Ranzini et al. ................ 705/64 |
| 2001/0018739 A1 | * | 8/2001 | Anderson et al. ............ 713/176 |
| 2002/0023055 A1 | | 2/2002 | Antognini et al. ............ 705/40 |
| 2002/0055909 A1 | | 5/2002 | Fung et al. .................... 705/42 |
| 2002/0126849 A1 | | 9/2002 | Howard et al. .............. 380/277 |

FOREIGN PATENT DOCUMENTS

JP        02001283007 A    * 10/2001

* cited by examiner

*Primary Examiner*—Andrew J. Fischer
*Assistant Examiner*—Cristina Owen Sherr
(74) *Attorney, Agent, or Firm*—Morgan & Finnegan, L.L.P.

(57) ABSTRACT

Embodiments of the present invention offer systems and methods for the transfer of persistently secure electronic representations of funds and/or descriptive data through the use of digital rights management (DRM) containers transmitted as e-mail attachments. Further embodiments of the invention provide authentication services and customer support.

35 Claims, 7 Drawing Sheets

SYSTEM AND METHOD FOR SECURE DATA AND FUNDS TRANSFER

This application is a continuation-in-part of U.S. application Ser. No. 09/501,874, filed Feb. 10, 2000 now U.S. No. 7,120,606.

FIELD OF INVENTION

This invention relates to systems and methods for transferring funds and data.

BACKGROUND INFORMATION

With the advent of mass electronic communication and commerce, a need has arisen with respect to a simple way to transmit funds electronically for payment or other purposes in a completely secure manner. Furthermore, with the growing placement of enterprise resource planning (ERP) systems in businesses, and the growing use of personal finance computers programs by individuals, there has arisen a need to transmit the descriptive data related to these systems and programs in a completely secure manner. What is more, although electronic commerce provides many conveniences, it lags behind paper and face-to-face transactions in terms of trust. Said more plainly, with electronic commerce, it difficult to know "who one is dealing with".

Current methods of transmitting funds and descriptive data have proven vulnerable to a variety of attacks by criminals. For healthcare companies, whose descriptive data often contains patient records, keeping descriptive data persistently and pervasively safe from attack and exploitation regardless of where in the internet cloud or regardless of how many parties in a vertical or horizontal supply chain receive this information is particularly important. In fact, with the Health Insurance Portability and Accountability Act (HIPAA), it is a legal obligation.

Another flaw of current methods is that descriptive data, such as ERP-related data, flows separately from the funds transfers to which they relate. Managerial chaos can ensue, for example, when the arrival of ERP-related data lags behind the arrival of payment data. Under such circumstances a company could ship products to another company and receive payment for those products, but have their ERP system tell them that payment had not been received and that the products had not shipped. Based on the erroneous ERP data, the company might believe that they had more product stock than they actually did, leading to incorrect business decisions.

SUMMARY OF THE INVENTION

Embodiments of the present invention offer systems and methods for the transfer of persistently secure electronic representations of funds and/or descriptive data through the use of digital rights management (DRM) containers transmitted as e-mail attachments. Further embodiments of the invention provide authentication services and customer support.

DETAILED DESCRIPTION OF THE INVENTION

Figure 1:
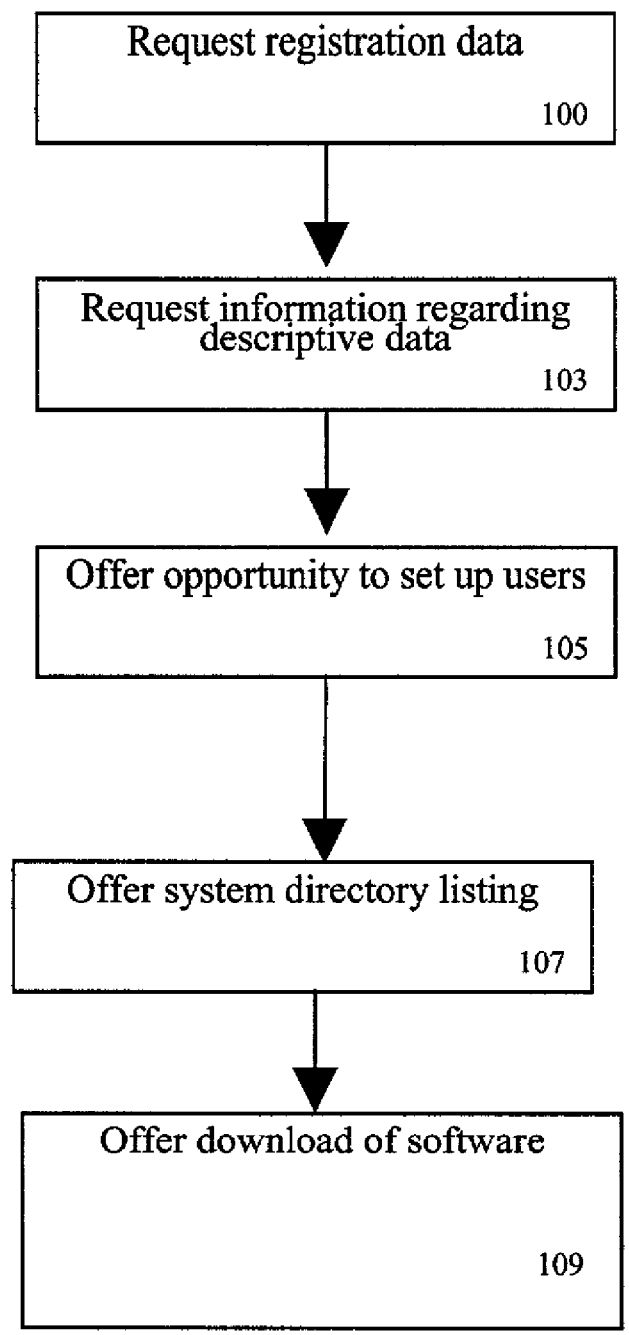
FIG. 1 is a flow chart showing the steps involved in entity registration according to embodiments of the invention.
Figure 2:
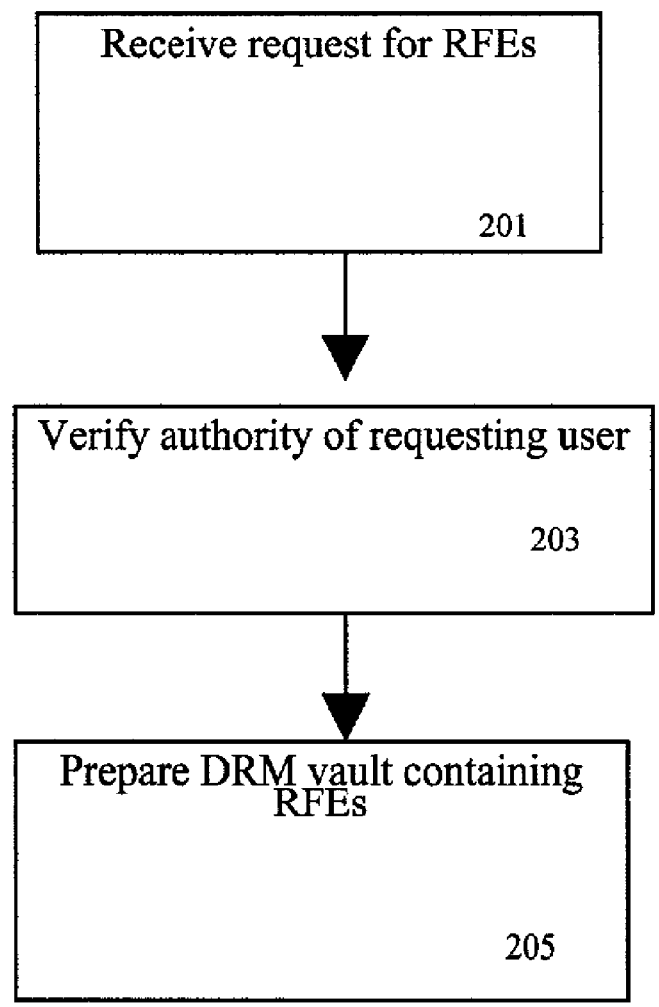
FIG. 2 is a flow chart showing the steps involved in RFE procurement according to embodiments of the invention.
Figure 3:
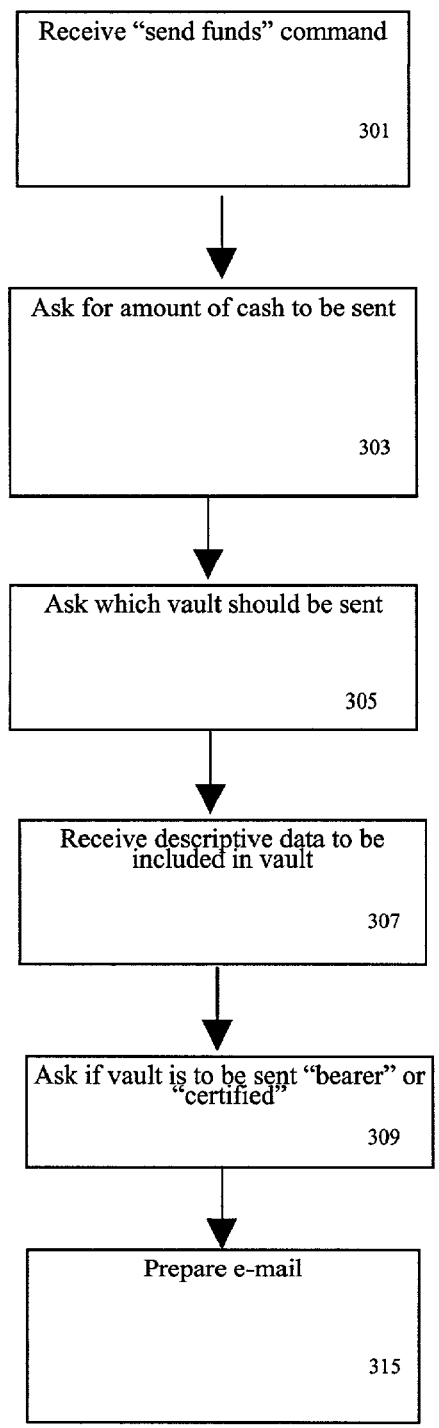
FIG. 3 is a flow chart showing the steps involved in vault transmission according to embodiments of the invention.
Figure 4:
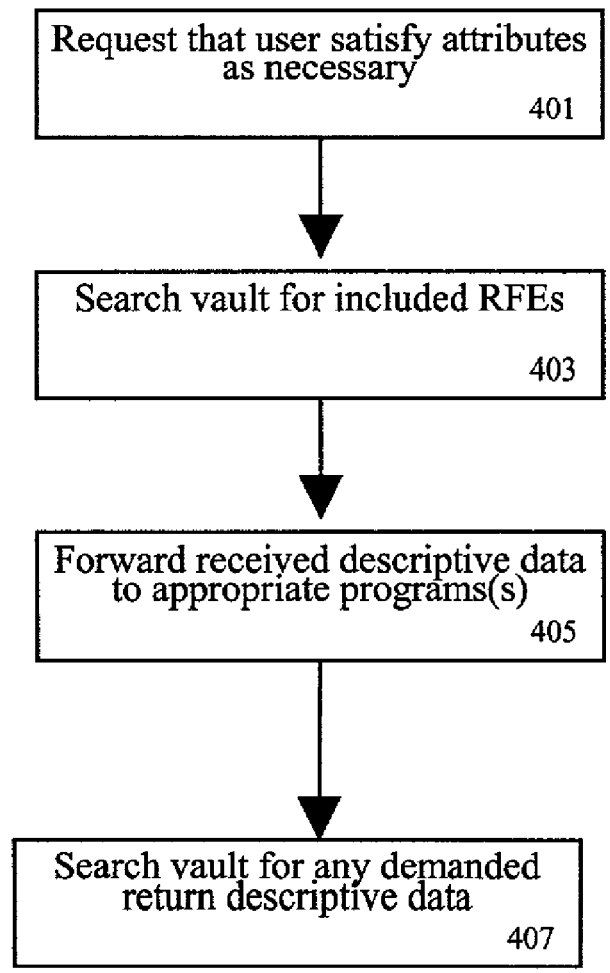
FIG. 4 is a flow chart showing the steps involved in vault reception according to embodiments of the invention.
Figure 5:
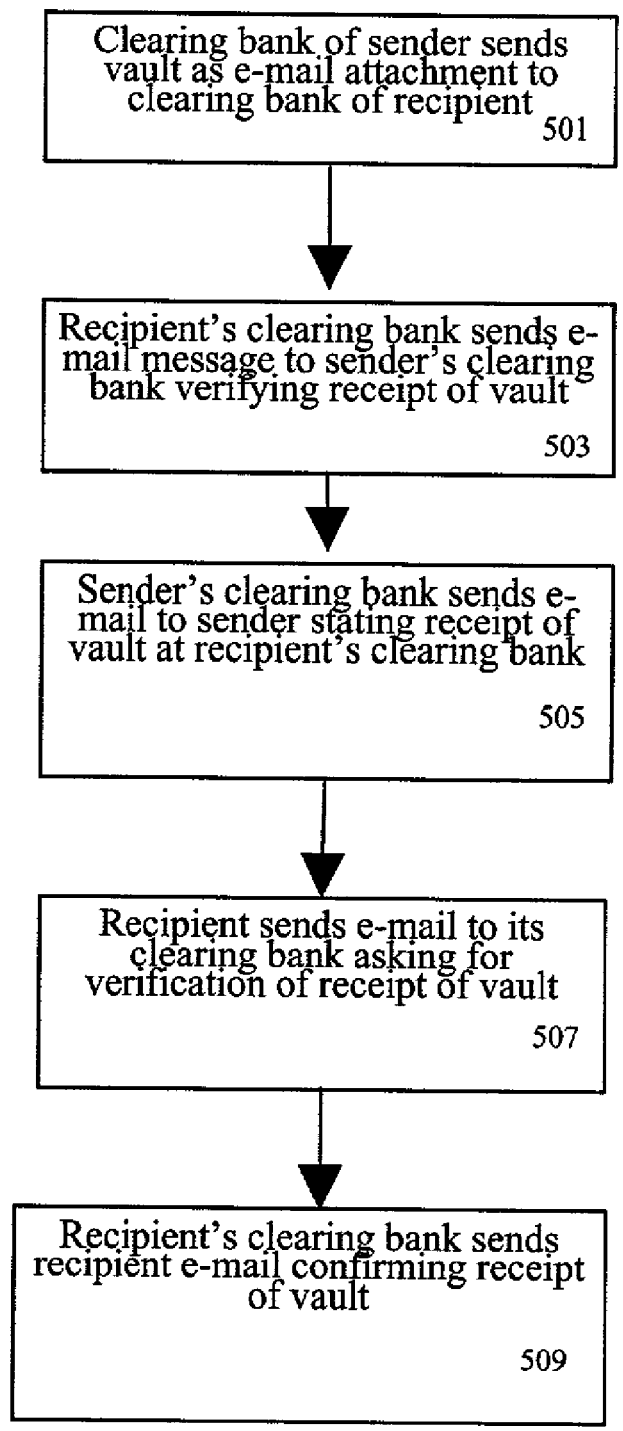
FIG. 5 is a flow chart showing the steps involved in vault transmission and reception according to embodiments of the invention.
Figure 6:
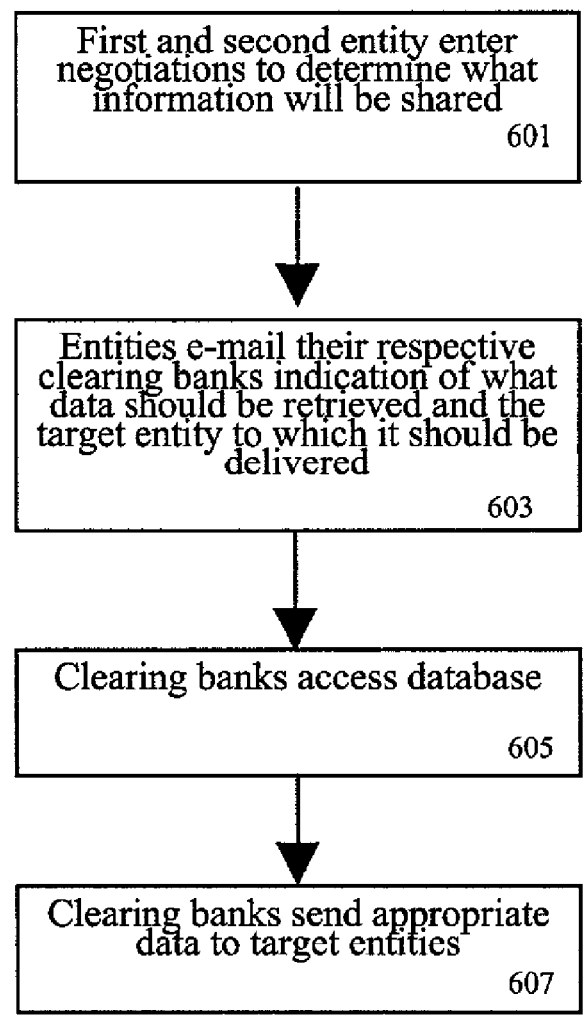
FIG. 6 is a flow chart showing the steps involved in authentication according to embodiments of the invention.

According to embodiments of the present invention an entity such as an individual, corporation, or the like may send an electronic representation of finds ("RFE") and/or descriptive data to another entity such as an individual, corporation, or the like using digital rights management (DRM) containers transmitted as e-mail attachments. As is known in the art, DRM containers provide persistent security. The cryptographic security method used to secure the DRM container intrinsic to the container could be based on a proprietary method (such as InterTrust) or an open standard such as Rijndael/AES. These e-mails could be sent over the internet, over a virtual private network (VPN), or by other means known in the art. The descriptive data may be, for example, enterprise resource planning (ERP) data, data related to a personal finance program such as Inuit Quicken, medical records, or data related to medical records. DRM containers holding such RFE and/or descriptive data may be referred to herein as "DRM vaults".

According to further embodiments of the present invention, authentication services are provided. These services, for example, allow two entities wishing to perform a financial transaction via DRM vault exchange to verify each others' credentials before proceeding with the transaction. The credentials verified may include the credit-worthiness, Better Business Bureau rating, stock price and/or volatility, and the like. As will be described herein, according to embodiments of the invention, these authentication services may be performed through the exchange of DRM container e-mail attachments. As above, such e-mails could be sent over the internet, over a virtual private network (VPN), or by other means known in the art. It is further noted that according to certain embodiments of the invention, the content of all e-mails sent according to the systems and methods described herein may be placed with DRM containers attached to those e-mails. In further embodiments two entities wishing to perform a financial transaction, even those not previously known to each other or trusted, could utilize their existing connections with their clearing banks or a financial institution corresponding with a clearing bank to provide authentication, trust brokering and financial settlement of a transaction. Where two Customers and two Financial Institutions are involved, this so-called "Four Corner Model" such as is incorporated into FAST or Identrus could be utilized in conjunction with the DRM vaults.

Additional information concerning the functionality of the present invention may be found in U.S. application Ser. No. 09/501,874, incorporated herein by reference.

Entity Registration

An entity wishing to send or receive DRM vault e-mail attachments according to the present invention may first chose to or be required to register. However, certain embodiments of the invention may additionally allow for "on-the-spot" registration wherein an unregistered entity may forgo registration until receipt of a DRM vault.

In either case, an entity wishing to register does so with one of a plurality of clearing banks established in accordance with the invention. Depending on the embodiment, the entity or a representative thereof may, for example, register by visiting a clearing bank in person, or by interacting with a clearing bank's computers and/or personnel using a standard browser or specialized software running on a general purpose computer. The general purpose computer may be, for example, a Macintosh G4 running OS X, a Dell Dimension running Linux or Windows XP, or a PDA running Linux, Windows CE, or Palm OS. In certain embodiments an automatic teller machine (ATM), a telematics device or point-of-sale device (POS device) may be used in place of a general purpose computer.

The information that a clearing bank demands from a registrant will depend on the embodiment. In some cases, each clearing bank may be allowed to decide what information will be demanded. In other embodiments an administrator or administrative body overseeing all of the clearing banks may make the decision. For example, a registrant may be required to provide a name, an e-mail address, a Social Security or Federal Tax ID number, a date of birth or incorporation, and information relating to an established account at a conventional bank such as an ABA number or account number (step 100). Additionally, the entity may be required to grant the clearing bank permission to check the entity's creditworthiness. Credit worthiness may be checked, for example, by querying the entity's conventional bank or by using a credit bureau service such as TRW. In certain embodiments, some or all of this collected data may be stored on a secure database for use in system authentication services. Authentication functionality will be described in more detail below.

In accordance with embodiments of the invention, during registration an entity may be given the option to register for the ability to send and/or receive descriptive data. In certain embodiments additional fees may be associated with selecting this option.

Upon selection of this option, the entity might be asked to provide information specifying the type or types of descriptive data to be sent and/or received (step 103). For example, a corporation might specify that the descriptive data be ERP data produced by and/or compatible with Peoplesoft 7.5 and/or related software such as Peoplesoft Financials or Peoplesoft Supplychain. As a second example, an individual might specify that the descriptive data be financially-related data produced by and/or compatible with a personal finance program such as Inuit Quicken. As a third example, a medical insurance carrier might specify that the descriptive data be data related to patient records, the data being produced by and/or compatible with its own proprietary in-house software.

In certain embodiments the entity might be able to specify that more than one type of descriptive data be sent and/or received. For each type the entity might be given the option to send but not receive that descriptive data type, to receive but not send that descriptive data type, or to both send and receive that descriptive data type. Specification might be done, for example, by selecting from a menu associated with the above-noted browser or specialized software that listed choices such as popular ERP and personal finance packages. The menu might additionally offer an "in-house software" choice whereby an entity such as that of third example could specify that in-house software was to be used. In such a case, the entity might be required to provide information relating to the data formats accepted and/or produced by that in-house software.

In certain embodiments, during registration the entity may be required to or given the option to establish users with various access authorities (step 105). It may be required that the entity specify certain data relating to each user, such as the user's name, e-mail address, social security number, voice sample, handwriting sample, thumbprint, and/or retinal or iris scan. The system might store such information in a secure database, perhaps storing the information in DRM containers. In certain embodiments, the system might automatically establish at least one default user corresponding to the entity.

As one example of user establishment, suppose the head of a household was registering. She might choose to establish herself and her husband as users with unlimited transaction capability and full access to all functions, including descriptive data transfer (e.g., personal finance software data), while allowing her children only the ability to send or receive RFEs with a per-transaction cap of $250 US. As another example, a corporation might give to its Chief Financial Officer (CFO) unlimited transaction capability and full access to all functions, descriptive data transfer, give to its Director of Accounting the ability to send and receive ERP data relating to his apartment and the ability to receive but not send RFEs, and give to manufacturing director the ability to send and receive ERP data relating to his department and the ability to send RFEs with a per transaction cap of $50,000 but no ability to receive RFEs.

In some embodiments a standard template or privacy matrix with authorities could be established for use by all users in a value chain or in a vertical or horizontal supply chain. In order to participate in the supply chain or trading network, use of the standard template would be a requirement on all users.

Additionally, in certain embodiments during registration the opportunity to list the entity and/or one or more of its users in one or more system directories may be offered (step 107). In certain embodiments, being listed in a system directory would be mandatory rather than optional. According to embodiments of the invention, one such system directory could be a "Directory of Synergistic Services", a directory for listed corporate entities and/or established users thereof, alternately known as the "System Yellow Pages". Another such directory could be a "Consumer Directory", alternately known as the "System White Pages."

For example, a corporation might be offered the opportunity to be listed in the System Yellow Pages. If the corporation accepted, it might be given the opportunity to list one or more of any established users. Thus a System Yellow Pages listing for a certain corporation might also list users corresponding to its CFO, Director of Accounting or Accounts Receivable department. Alternatively, different sales teams could be listed or the listing could be by product, SIC code, SKU, services offered or other industry standard classification. As another example, an individual might be given the opportunity to be listed in the System White Pages. The individual may choose to list as users herself and her husband. In certain embodiments, directories will list actual e-mail addresses corresponding to users and/or entities. In other embodiments, aliases may instead be listed. In such embodiments, the system could be configured so that an e-mail containing a DRM vault attachment addressed to an alias would be forwarded by the system to the e-mail address corresponding to that alias. The system might provided this functionality by having each alias be an e-mail address corresponding to a clearing bank and having the clearing bank forward the e-mail to the appropriate address based on e-mail-alias correlations stored in a secure database. In some embodiments of the system, the clearing bank could also provide email virus-checking and protect against denial of service attacks, or provide a utility to validate the authenticity of a message with an attached DRM vault.

Alias functionality could allow users and entities to be accessible via the directories while allowing them to keep their e-mail addresses private. Such functionality is also expected to prevent marketers from using the directories as sources of e-mail addresses for spamming purposes. In such embodiments, an entity might be given the opportunity to choose aliases for itself and/or its users. In other such embodiments, the users themselves would be given the opportunity to choose their own aliases. In still other such embodiments, aliases would be assigned by the system.

Once the clearing bank had received the requested information relating to an entity, including perhaps verification of credit-worthiness and the like, the clearing bank could establish a financial account for the entity and set up the various users accounts specified by the entity. The system might provide for each user a user ID and/or password, or other authentication method known in the art. A Customer Information database using standard database technology or databases using DRM vaults could be established by the clearing bank to hold customer profiles and other attributes such as age, authorities and risk parameters. In some embodiments, other databases whether secured by DRM vault or not could be established by a clearing bank or a bank-centric network of clearing banks such as Pending Transactions, Aliases, Validation, valid eCheck numbers, Authentication, Authorities, Audit, or ERP data databases.

If the entity was not already in possession of it, the clearing bank could then offer for download DRM-V software necessary to produce, process, and/or store DRM vaults (step 109). If sign-up had been performed using a general purpose computer, download of the software could be to that computer. If an ATM or POS device had been used for sign-up, the software could be vended on a CD-ROM or other storage medium for later installation on a general purpose computer. Alternately, the ATM or POS device might offer the download via IrDA to a portable or handheld general purpose computer. In still other embodiments, the ATM or POS device might display a website from which the software could be downloaded to a general purpose computer or a DRM vault enabled email message from an existing user to a new or potential user could contain the software. The ATM or POS device might additionally provide a password or other authentication method known in the art needed to access that website.

The DRM-V software could additionally have the capability to interface with one or more popular e-mail programs such as Microsoft Outlook or Apple OS X Mail. Alternately, the DRM-V software might possess its own capability to send and receive e-mail by, for example, interfacing with POP, Microsoft Exchange, a voice browser, and/or IMAP servers. Furthermore, the DRM-V software could have the capability to interface with the ERP, personal finance, or other descriptive-data related software specified by the entity. This DRM-V software could be the same as or separate from the specialized software noted above with respect to interacting with a clearing bank's computers and/or personnel. In some cases the DRM-V software would be downloaded to and run from a general purpose computer.

Additionally, in some embodiments, ATM machines and POS devices in various locations could run the DRM-V software.

RFE Procurement By an Entity

According to embodiments of the present invention a user acting on behalf of its corresponding entity wishing to transfer RFEs, and perhaps corresponding descriptive data, would need to have stored upon a general purpose computer a DRM vault containing RFEs. This might be the case if the entity had previously received such DRM vaults from another entity or had previously requested them from its clearing bank. If the entity is not in possession of such a DRM vault, or the DRM vault did not contain a sufficient amount in RFEs, the user could need to request one from its clearing bank.

Accordingly, the user acting on behalf of the entity might request from its corresponding clearing bank a DRM vault containing RFEs relating to a specified amount of a specified nation's currency (step 201). For example, the request might include the identity of the entity and the user and request a DRM vault containing $5,000 US Dollars of RFEs. In embodiments where the clearing bank did not already have on record information relating to the entity's conventional bank, the message might also include information such as an ABA routing number. The message might additionally include a user ID and/or password corresponding to the user, or other authentication methods known in the art.

It is further noted in cases where an entity wished to send RFEs corresponding to a currency other than the currency held in her entity's conventional bank that she could do so in accordance with the system and method of U.S. application Ser. No. 09/924,005, incorporated herein by reference.

The request could be sent in a number of ways. For example, it could be sent as an e-mail message created by the DRM-V software, perhaps in response to the user selecting "request funds" from a menu produced by the software. In some other cases the DRM-V software could act in conjunction with a conventional e-mail program such as Outlook. Alternately, a user might manually construct the message using a conventional e-mail program such as Outlook. In other embodiments, a user could pre-authorize the automatic replenishment of funds, when a set minimum level is established.

In some cases the data of the message, such as the password and ABA routing number, could be placed by the DRM-V software into a DRM container whose attributes were set such it could only be accessed by the clearing bank or certain employees thereof. Such attributes might be set so that access to the content of the container would require biometric verification. For example, that the container could be configured so as to only be openable by a certain employee of the clearing bank and that employee would have to prove her identity by her voice. Other ways of sending the message to the clearing bank could include telephone, FedEx document delivery, and in-person interaction.

Upon receipt of the message the clearing bank could first verify the authority of the requesting user (step 203). For example, the clearing bank could access one or more of its databases to determine that the entity was a registered entity, that the user was a user established by that entity and with the authority to make such a request. The clearing bank could next request from the entity's conventional bank the amount of cash corresponding to the amount requested by the entity in RFEs. Thus if the entity requested $5000 in RFEs, the clearing bank could request the transfer of $5,000 from the entity's account at the conventional bank. Transfer could be done in a number of ways known in the art for transferring money between financial institutions such as ACH, SWIFT, ATM POS, FedWire, or by using a message constructed using the FAST open standard, sent over a bank-centric TCP/IP communications network, such as a virtual private network (VPN).

Upon receipt of the funds from the conventional bank, the clearing bank would prepare a DRM vault containing the requested amount in RFEs (step 205). In certain embodiments, the clearing bank could incorporate into the DRM vault a unique serial number. Additionally, the clearing bank could set the attributes of the DRM vault so that its contents could only be accessed by one or more specific users corresponding to the entity. Rules for which users of the entity would have access could vary on the embodiment. For example, an entity could specify that DRM vaults be accessible by only the requesting user and the CFO. The clearing bank could then send the DRM vault as an e-mail attachment to the entity. In certain embodiments the clearing bank would save a copy of the DRM vault on its servers.

Now let us assume that the entity is in possession of a DRM vault containing at least the required amount of RFEs.

In cases where a DRM vault contained more RFEs than desired for a the transaction at hand, the user might be able to have performed an operation slightly analogous to the process wherein a individual with a dollar bill can "make change" and receive, for example, four quarters. Thus the entity's user could select from a menu of the DRM-V software the option "make change". In response the software could allow the user to select from the DRM vaults in its possession the one for which change is to be made. Once a DRM vault was selected, the DRM-V software could prompt for further instructions for making change. For example, the user might be able to specify that a DRM vault containing $500 in RFEs be broken into five DRM vaults containing $100 in RFEs each.

Continuing with the example, in certain embodiments, the DRM-V software could make change by accessing the contents of the selected DRM vault (perhaps querying the user for information needed to satisfy the vault's attributes), creating five new DRM vaults, populating each with $100 in RFEs, and setting the access attributes of each DRM vault to match the attributes of the selected vault. The DRM-V software might additionally include in each vault a unique serial number. In some embodiments the serial number would be chosen by the DRM-V software itself according to certain parameters set by the system administrator or creator. In alternate embodiments, the DRM-V software could request serial numbers from the clearing bank, perhaps by accessing the clearing bank's computers using, for example, Simple Access Object Protocol (SOAP), perhaps using a virtual private network (VPN) connection.

Alternately, making change would require the action of the clearing bank. The DRM-V software might prepare a message to the clearing bank specifying what change was to be made from the RFE in the DRM vault attached to the message. In some embodiments the message could instead be prepared manually by the user. An e-mail containing the instructional message and the DRM vault as an attachment could then be sent to the clearing bank in a manner analogous to that described above. In some cases the instructional message could also be included in a DRM container. Upon receipt of the e-mail, the clearing bank would create DRM vaults according to the instructions, for example five DRM vaults containing $100 worth of RFE each in exchange for a submitted DRM vault containing $500 with of RFE. The vaults could be set with attributes and perhaps serial numbers in a manner analogous to that described above and e-mailed to the entity. In some embodiments, the DRM vaults could have an expiration date of a any length, such as a month, a year, seven years, or a limit related to the legal escheat time limit.

DRM Vault Transmission by an Entity

According to embodiments of the invention, the user acting on behalf of the entity could select from the menu of the DRM-V software the option "Send Funds" (step 301).

In response to the selection, the DRM-V software could query the user to select from the available DRM vaults containing RFEs the vault to be transmitted. The software could present to the user a browser wherein a user could either highlight or choose a particular vault. Upon highlighting a particular vault, achieved perhaps by single clicking an icon corresponding to that vault the user could be presented with information concerning that vault, such as the dollar amount of RFEs contained therein. In certain embodiments, the user would need to provide the software with input for satisfying vault attributes in order to view information relating to the vaults. Upon selection of a vault, achieved perhaps by double clicking an icon corresponding to that vault, the software would understand that vault to be the one to be sent. In other embodiments, the software would automatically present to the user the current sum of the vaults present. Historical and transactional records could also be made available to the user.

Alternately, the DRM-V software might query the user for the amount of cash to be sent (step 303). In such an embodiment the DRM-V software could search among the available vaults for vaults which contained RFEs corresponding to at least the amount of cash specified by the user. In certain embodiments, in order to perform the search the software would need to query the user for the attributes needed to satisfy the attributes of the vaults that are the subject of the search. If the software found no vaults containing at least the required number of RFEs, the software might ask that the user request from its entity's clearing bank additional RFEs in the manner described above. In alternate embodiments, the DRM-V software may automatically request the RFEs from the clearing bank on behalf of the entity. Furthermore, if the software found no vault containing precisely the correct number of RFEs, but one or more vaults containing more than the necessary number of RFEs, the software would either query to user to request, in the manner described above, that change be made. Alternately, the software could automatically take the steps to have change made. Once change was made, the user could select a resultant vault containing the precisely appropriate amount of RFEs. Alternately, this selection could be made automatically by the software.

With the appropriate DRM vault selected, the DRM-V software might next query the user as to which entity, and in certain embodiments user thereof, the vault was to be sent (step 305). Perhaps by selecting options from a menu presented by the software, the user might be given the option to "Specify Recipient by E-mail Address", "Specify Recipient by Alias", "Search or Browse System White Pages", and "Search or Browse System Yellow Pages". The menu might also contain past recipients, for example, in a field with a drop down bar.

In the case where the first or second option was chosen, the user could then be prompted to enter the e-mail address or alias as appropriate. If the user selected the third or fourth option, the user could be able to use the interface of the software to either search the selected directory for entities and/or users matching specified criteria, or to browse the directories manually. The directories could be located on a central server and be accessible by the DRM-V software via a SOAP connection. Based on the results of browsing or searching, the user could select a user or entity to receive the selected DRM vault.

With a recipient chosen, the software could next ask the user if descriptive data was to be included in the vault and if descriptive data was to be demanded in return for the vault. If the user answered in the affirmative to either of these queries, the software could initiate wizard functionality to guide the user through the process of including descriptive data in the chosen vault and/or receiving descriptive data in return for the vault (step 307).

As a first step, if during initial registration the entity specified that more than one type of descriptive data could be sent and/or received, the software could ask the user acting on behalf of that entity to select the descriptive data type to be sent and/or received. For example, if during registration the entity had specified both Peoplesoft Financials and Peoplesoft Supplychain, the DRM-V software could query the user as to which one or more of these two Peoplesoft programs would be receiving and/or supplying descriptive data. The user might specify, for example, that the descriptive data to be included in the selected DRM vault would be produced by Peoplesoft Financials, while the descriptive data received in return would be for Peoplesoft Supplychain. Such a specification might be made, for example, if the RFEs included in the DRM vault were to purchase automotive belts from a supplier; the purchasing entity could include ERP data produced by Peoplesoft Financials relating to the exchange of money in the outgoing DRM vault and expect incoming ERP data relating to the acquisition of these belts meant for Peoplesoft Supplychain.

The DRM-V software could access the descriptive data to be included in the outgoing vault in a number of ways. For example, the DRM-V software could request that the user use the specified descriptive data source program to create an export file. Once the file was created and saved to local storage, the DRM-V software could request that the user select it from a file browsing window. In another embodiment, the DRM-V software could interact directly with the specified descriptive data source program, using a technique such as Apple Events, AppleScript, Microsoft Virtual Basic for Applications, Java Remote Procedure Call (RPC), or Apple Distributed Objects. Certain of these techniques might require an initial modification to the descriptive data source program. This could be done, for example, through a software "patch" or "service pack". In some embodiments, a local network administrator would be able to use a help wizard that could utilize open or published application protocol interfaces (APIs) to install the patch or service pack. Further, in some embodiments, a network administrator or individual user could opt to automate the receipt or origination of vaults with RFEs, with or without ERP data.

Next, the DRM-V software could ask the user if the vault was to be sent "bearer" or "certified" (step 309). If bearer mode was selected, the recipient of the vault would not have to satisfy any security attributes to access the vault. On the other hand, if certified mode was selected, the user would be asked to specify what attributes would need to be met to access vault contents. For example, the user might specify that attributes be set so that the vault would only be accessible by a particular user corresponding to the selected addressee entity, and that the addressee would have to satisfy a retinal scan in order to gain access. Data concerning the retinal properties of the selected user necessary to set vault attributes could be accessed from a centrally-located database by the DRM-V software. In certain embodiments, the access could occur over a secure link such as a VPN using a technique such as SOAP.

Next, the DRM-V software would ask the user to select an authentication method to be used by the recipient of the selected DRM vault. It if was unknown by the user which authentication methods were enabled by the recipient, the public portion of the Alias database could be consulted by the user. The authentication method could be different from those used by the user or in other embodiments could be automatically selected by the clearing bank based on message attributes, such as transaction size.

At this point in the process flow, the DRM-V software would be in possession of a specified recipient for the selected DRM vault, and perhaps descriptive data to be included with the vault and an indication of descriptive data expected in return for the vault. Accordingly, the DRM-V software could prepare the vault for transmission.

As a first step, the software might add to the vault any descriptive data to be sent. In some embodiments, the software could translate the descriptive data into a generic format defined by the system's operators, perhaps using XML. Translation could include in the XML file an indication of the original source program or source program class. For example, the file might indicate that the source of the data was Peoplesoft Financials and that the target could be Peoplesoft Financials or a similar ERP financial program. This file translation functionality could ease exchange of descriptive data, such as ERP data or HIPAA compliant claims data, between two companies using different descriptive data producing software. In certain embodiments, addition of items to the vault would require that the user satisfy the security attributes set in the vault. Accordingly, in certain embodiments the user would at this point be asked to provide the data necessary to satisfy the attributes. In other embodiments, such data would be asked for by the DRM-V software upon initiation of the send process and the data so captured would be used whenever necessary to access or manipulate the vault. Next, the DRM-V software could incorporate into the vault an indication of any descriptive data expected in return for the vault.

In certain embodiments, as a next step, the system could update a possessor data structure in the vault to reflect to user and/or entity for which it is intended. Further details of the possessor data structure will be provided below. Next, in cases where the user had selected certified mode, the system could set the attributes of the vault accordingly. The DRM vault would now be ready for transmission.

In some embodiments the DRM-V software would prepare an e-mail addressed to a user corresponding to the recipient entity with the vault as an attachment, and interface with a POP, IMAP, Microsoft Exchange, or other mail server so as to send the mail (step 315). The DRM-V software could use the "cc:" or "bcc:" capability of e-mail to automatically send a copy of the message and attached vault to the clearing bank of the sending entity. Upon receipt of the copy vault, the clearing bank could access the contents, satisfying vault attributes as necessary. The vault, including any included RFEs and/or descriptive data (e.g., ERP data), could be stored on a secure server by the clearing bank. Alternately or additionally, the clearing bank might store included descriptive data in a "ERP Database" or "Descriptive Data Database". In some embodiments such as database might secure its content pervasively using digital rights management.

According to certain embodiments of the invention, clearing banks, or computers or certified officers thereof, would have the ability to access the contents of all vaults used in the system. In embodiments where this was not the case, the DRM-V software might need to alter the attributes of the vault prior to transmission to the clearing bank to allow full or limited access by the clearing bank or members of the law enforcement or bank regulatory communities for online, real time research capabilities through the various system databases, such as the cleared transactions database or pending transaction database.

Upon receipt of a copy vault with a certain serial number, the clearing bank could update its records so as to transfer from the sender ownership of the funds corresponding to the RFEs of the vault. In some embodiments, the clearing bank could transfer ownership to the intended recipient of the vault automatically. In cases where the recipient used a different clearing bank from the sender, an e-mail message could be sent to the receiver's clearing bank informing it of the transfer. In other embodiments, the clearing bank might first transfer possession to a withholding account controlled by the sending clearing bank and not transfer possession to the intended recipient until that recipient verified receipt of the vault. In addition to transferring possession to a withholding account, the clearing bank might place a record corresponding to the transaction in a Pending Transactions Database. Upon later transfer of possession, the record corresponding to the transaction may be deleted from the pending transactions database and a record corresponding to the transaction may be created in a Cleared Transactions Database.

In alternate embodiments, the software might interface with a conventional e-mail program to send out the message and attachment, perhaps using Apple Events or AppleScript. In still other embodiments, the DRM-V software might instruct the user to use a conventional email program to manually create an e-mail including the vault for transmission to the recipient and the clearing bank. In certain cases, in order to keep secret the e-mail address of a user or entity who wished to be known only by alias, the e-mail message with DRM vault attachment would be sent only to the clearing bank, and the clearing bank would forward it to the appropriate user or entity.

After transmission, the DRM-V software might additionally note in its log the serial number of the sent vault. Further details of this functionality will be provided below.

Furthermore, the e-mail message to which a vault was attached might include in the freely-readable text of the e-mail instructions and/or hyperlinks for registering with the service. Therefore an unregistered entity that received a vault as an e-mail attachment could easily know how to join the service. The message might additionally include a voice telephone number to call whereby a non-member could verify receipt of the vault. Upon calling, the recipient might be asked to give information such as the entity's ABA number. According to certain embodiments, such functionality could allow the sender's clearing bank to tentatively earmark as possessed by the unregistered recipient the funds corresponding to the RFEs sent in the vault without having to wait for the recipient to complete registration.

DRM Vault Receipt by an Entity

In certain embodiments, DRM-V software running on a recipient's computer could monitor incoming e-mails for those with attached DRM-V vaults. Upon discovering such an e-mail, the software could perform processing upon it. Alternately, such monitoring might not occur. In such embodiments a user, upon receiving an e-mail with an attached DRM vault, could save the vault, and perhaps the e-mail message itself, to local storage and then open those items using the DRM-V program.

As a first processing step, the DRM-V software might request from the appropriate user corresponding to the recipient entity input necessary to satisfy any security attributes associated with the received DRM vault (step 401). As alluded to above, this might require, for example, that the user provide a password, physical token and/or biometric input such as a fingerprint scan. In cases where the sender chose bearer mode, this step might be unnecessary.

With access to the contents of the DRM vault, the DRM-V software might next search the vault for included RFEs (step 403). Upon determining the amount included, the software might present a message to the user stating, for example, the identity of the sender and the dollar amount received. In embodiments where such as step was necessary or of benefit, the software might next send an e-mail message to the recipient's clearing bank to confirm receipt of the RFEs. The DRM-V software might query the user before sending this message. As will be described later, a user might answer negatively to the query in the case where the sender chose bearer mode.

Upon receipt of this e-mail the recipient's clearing bank could record the intended recipient as the owner of the actual funds corresponding to the RFEs. If the sender used a different clearing bank, the recipient's clearing bank could then send an e-mail message to the sender's clearing bank verifying receipt of the vault. The message might additionally request that the actual funds be transferred to it from the sender's clearing bank. The sender's clearing bank could comply with the request using a method such as FedWire, or make an internal transfer from one blocked account to another analogous to the method used for securities transfer at the Depository Trust Company.

According to embodiments of the invention, RFEs are denominated with reference to and relate to actual funds of a particular national currency, such as the U.S. Dollar. It is therefore conceivable that an entity receiving RFEs relating to a particular currency might wish to exchange those RFEs for RFEs relating to a different currency. The entity's clearing bank could meet this request by exchanging the actual currency corresponding to the received RFEs for a specified currency in accordance with the system and method of U.S. application Ser. No. 09/924,005, incorporated herein by reference.

In certain embodiments, the user could choose to move the just-received funds, or previously received funds, from her entity's clearing bank to her entity's conventional bank. Such a request could be made, for example, by selecting a menu option from the DRM-V software. In response the software could send an e-mail to the clearing bank making this request. In other embodiments the user could manually produce and send this e-mail. In response to the e-mail, the clearing bank could transfer the funds to the appropriate conventional bank using a method such as FedWire or ATM POS.

In certain embodiments, the software could automatically request the movement of just-received or previously funds to the entity's conventional bank. The software could make the decision to request movement based on attributes set by, for example, an entity, user established by an entity, or a system administrator. For example, set attributes might state that the program should, upon receipt of finds valued at more than a predetermined amount (e.g., $5000.00), request movement of those funds to the entity's conventional bank. As another example, set attributes might state that after receiving via a plurality of transactions a total sum of more than a predetermined amount, the software should request movement to the entity's conventional bank of the funds corresponding to that total sum.

Next, the DRM-V software could search the vault for any included descriptive data. The software could then determine the format of the data. For example, the software might determine that the data was in Peoplesoft Financials format or was in the generalized XML format of the system. As alluded to above, when generalized XML format was used the XML file might suggest a program or class of programs for receiving the data.

In certain embodiments, based on information collected during sign-up of the entity, the DRM-V would know what descriptive data program the receiving entity was in possession of. In other embodiments this information could be set using the DRM-V software. Based on the knowledge of the format of the descriptive data received and the descriptive data programs in possession of the recipient, the DRM-V software could perform any file format conversion necessary using techniques known in the art. Since XML data files are relatively large and processing XML data can be time intensive, various specialized, industry specific or general purpose XML compilers could be created and employed by the software either at the client or network level to greatly enhance computational speed.

Next the DRM-V software could take steps to forward the received, and perhaps translated and/or compiled, descriptive data to the appropriate descriptive data program of the recipient (step 405). For example, the DRM-V software could interface with the appropriate descriptive data program using a technique known in the art such as Apple Events, AppleScript, Apple Distributed Objects, SOAP, or Java RPC. Alternately, the DRM-V software could write out a file to a storage device of the general purpose computer and query the user to manually load the file from within the appropriate descriptive data program.

As a next step, the DRM-V software could search the received DRM vault for any demand for return descriptive data (step 407). For example, a vault might include a demand for ERP data produced by the recipient's supply-chain descriptive data software relating to purchased device components. In response the DRM-V software could request the data from the appropriate descriptive data program by interfacing with it using a technique known in the art such as Apple Events, AppleScript, Apple Distributed Objects, SOAP, or Java RPC. Alternately, the DRM-V software could query the user to manually use the appropriate descriptive data program to write out to a storage device of the general purpose computer a file containing the necessary descriptive data. The DRM-V software could then access the data from the storage device.

Once in possession of the descriptive data for return to the sender, the DRM-V software could prepare transmission of the data. According to one embodiment, the DRM-V software would create a DRM vault and place the data within that vault. The software might then prompt the user for attributes to be applied to the vault. In other embodiments the DRM-V software might automatically set such attributes. The manner of setting the attributes could be analogous to that described above with reference to vault transmission by an entity, whereby the contents of the vault could only be accessible by one or more users corresponding to the target entity. The created vault could then be attached to an e-mail message addressed to the appropriate entity or user thereof in a manner also analogous to that described above with reference to vault transmission by an entity. In other embodiments, the return descriptive data could be attached to an email message and sent to a clearing bank or bank-centric network administered database.

As alluded to above, under circumstances such as when the sender chose bearer mode, a user corresponding to the recipient entity might choose against having that entity's clearing bank informed of the receipt of the corresponding RFEs. Accordingly, under such circumstances there might not be actual transfer of ownership to the receiving entity of the funds corresponding to the RFEs. Instead, the actual funds might sit in a withholding account managed by the sender's clearing bank.

Under such circumstances, the RFEs could be kept by the recipient entity or could be transferred to another entity in the manner described above. Any entity in possession of the RFEs could inform its clearing bank of this fact, generally leading to the transfer to that entity of the actual funds corresponding to those RFEs. By "generally" is meant at least that in the case where multiple entities attempted to inform their respective clearing banks of possession of RFEs corresponding to the same actual funds, the actual funds would only be transferred to the first requesting entity. Similarly, if the same entity tried to inform its clearing bank multiple times of RFEs corresponding to the same actual funds, actual funds would be transferred to that entity no more than once. Such functionality could provide a sort of fraud protection.

It is additionally noted that when an entity successfully informs its clearing bank of possession of RFEs sent bearer mode, the software might additionally take steps to add to the vault containing those RFEs security attributes that can be satisfied only by that entity.

Additional Vault Transfer and Reception Technique

According to another embodiment, an entity wishing to send RFEs to another entity need not have stored on a general purpose computer or the like a DRM vault containing those RFEs. This embodiment might be employed, for example, if a user wishes to send a vault using DRM-V software running on a smart card, an ATM, telematics device or POS device, perhaps in a self-service environment.

As another example, this embodiment could be employed in a voice-operated version of the system. In such an embodiment, a user could perform the below-described operations using a conventional telephone. The telephone could interface with a central computer with one or more telephone interfaces and voice synthesis and recognition capability as known in the art. The computer could run a specialized copy of the DRM-V software which presented prompts, messages, and the like using a synthesized voice and allowed all queries to be answered using voice commands.

Upon telephoning the system, the caller could be identified as a valid user corresponding to a certain entity based on the sound of her voice. This could be done using biometric techniques known in the art. The biometric recognition could be repeated at various intervals throughout the call, including the use of randomly generated voice biometrics based passwords that are repeated back, and also is able to satisfy security attributes of DRM vaults.

Although ATM, smart card, telematics devices, POS, and voice-operated operation is mentioned here, it is specifically noted, however, that this technique is also applicable for DRM-V software running on general purpose computers.

According to this embodiment, a user could request RFEs in a way similar to that described in the above sections, but the request would further indicate the recipient for the vault containing the RFEs. As above, the recipient could be indicated, for example, by e-mail address, by alias, or by selection from a system directory.

Next, instead of sending the vault with the requested RFEs to the requesting entity as described above, the clearing bank of the sender could send the vault as an e-mail attachment to the clearing bank corresponding to the recipient (step 501). The sender's clearing bank might determine the clearing bank corresponding to a specified recipient by consulting a secure database that associates recipients. If the sender and receiver use the same clearing bank, this and similar steps may be eliminated and/or modified in certain embodiments.

As a next step, upon receipt of the e-mail with attached vault, the recipient's clearing bank could, in certain embodiments, record the intended recipient as the owner of the actual funds corresponding to the RFEs of the vault (step 503). The recipient's clearing bank could then send an e-mail message to the sender's clearing bank verifying receipt of the vault. The message might additionally request that the actual funds be transferred to it from the sender's clearing bank. The sender's clearing bank could comply with the request suing a method such as FedWire or ATM POS.

Next, the sender's clearing bank could send an e-mail message to the sender stating that the vault containing the RFEs had been received at the recipient's clearing bank (step 505). If the actual funds had been transferred, the message might also inform the sender of this fact.

Upon receipt of this message, an e-mail message stating that RFEs, and perhaps the actual finds, had been transferred could be sent from the sender to the recipient. This message could be sent automatically by the DRM-V software upon its receipt and recognition of the message from the sender's clearing bank. Alternately, the message could be sent manually by the sender of the vault.

Upon receipt of this message, the recipient could send an e-mail message to its clearing bank asking for verification of the receipt of the vault containing the RFEs (step 507). If appropriate, the e-mail message might also inquire about the receipt of the actual funds. In a manner similar to that described above, this message could be sent manually by the recipient (or user established thereby) or automatically by the recipient's DRM-V software.

In response, the recipient's clearing bank could send an e-mail message to the recipient confirming receipt of the vault and actual funds as appropriate (step 509). Upon receipt of that message, the recipient could manually or automatically send an e-mail message to the sender confirming deposit of the vault, and perhaps actual funds, at the recipient's clearing bank. According to certain embodiments, the contents of each e-mail noted above could reside in a DRM container attached to the e-mail rather than in the free text of the e-mail.

Security Measures

As noted above, after transmission, the DRM-V software might additionally note in a log the serial number of each sent vault. If an user acting on behalf of the entity later tried to send a vault with the same serial number, and the entity had not re-received that vault from another entity in a transaction, the software might disallow the send function. Alternately, the software might give the following warning to the user in a dialog box. For example, the dialog box might state:

*WARNING*

According to my records, this vault has already been transmitted on 01/02/03 at 13:23:22. Unless that transmission was not received by the addressee, and you are attempting retransmission, you should probably not proceed. If you feel this message is in error, please e-mail or telephone customer service.

Do you wish to proceed?

[YES] [NO]

Please not that if you proceed, customer service will be specifically alerted. This procedure helps keep your accounts safe.

Accordingly, if the user proceeded, the clearing bank, perhaps by an e-mail message, could be specifically notified of possible fraud. If the bank determined that retransmission was performed because of a faulty transmission or for another valid reason, no further action would be taken. On the other hand, if initial investigation did not quell the clearing bank's fears of possible fraud, the clearing bank might take action such as contacting a full-privileges user corresponding to the sending entity, such as a company's CFO or Head of Accounting, by telephone and suspending transactions by that entity until the matter was resolved.

Another security measure will now be discussed. As alluded to above, in certain embodiments each DRM vault may contain a data structure listing all entities and/or users who had been in possession of that vault. For example, suppose a vault was requested from Clearing Bank X by Entity A, who in turn sent it to Entity B, who in turn sent it to Entity C. The data structure might read:

Clearing Bank X
Entity A
Entity B
Entity C

Depending on the embodiment, various techniques may be used to denote in a vault's data structure the entities and/or users who had been in possession of that vault. For example, the entities and users could be listed by name, e-mail address, or alias. In certain embodiments, attributes of DRM vaults would be set so that while the DRM-V software and system administrators could view and edit this data, users established by entities could not. In embodiments where vaults included this data structure, the DRM-V software could prior to transmission of a vault to a specified user corresponding to an entity, annotate the data structure so as to include the recipient.

Incorporation of this structure could help prevent fraud within the system. As explained above, when a DRM vault is sent as an e-mail attachment to a recipient, a copy of the vault is sent to the sender's clearing bank. Upon receipt of the vault, the clearing bank would compare the possessor data structure of the received vault with the data structure of an earlier incarnation of that vault to check for consistency of history. The newly-received vault would be matched by its earlier incarnation, for example, by match of serial number.

If there was a historical inconsistency between the received vault and the earlier incarnation, the system might determine a possibility of fraud and take appropriate action. As an example of a historical inconsistency, suppose an earlier incarnation of vault s/n 0004 stored at the bank had a data structure listing:

Clearing Bank X
Entity A
Entity B

Entity C
Entity J
Entity R
Entity P

And the newly received copy of the vault with the same serial number had the data structure:

Clearing Bank X
Entity A
Entity B
Entity C
Entity J
Entity Q

This might suggest that, while in possession of Entity J, that the vault had been illegally duplicated in an attempt to pay both Entity Q and Entity P using RFEs corresponding to the same physical currency. Action taken by the system could vary depending on the embodiment. For example, in some cases the system could automatically decide that Entity P was the true recipient because it received vault s/n 0004 first. The system might then send an email message to one or more users corresponding to Entity Q stating that the received vault was not valid. In other embodiments, the system might bring the situation to the attention of a system or clearing bank administrator and allow her to decide what action to take.

The possessor data structure can be used for purposes other than fraud detection. For example, in certain embodiments, the clearing bank might consider the currency corresponding to the RFEs of a particular vault to belong to the entity corresponding to the most recent addition to the data structure. Therefore, if there were no historical discrepancy or other signs of possible fraud, upon receipt of copy of a vault with a certain serial number, the clearing bank would update its records accordingly.

Authentication

Certain embodiments of the present invention provide authentication services wherein two entities contemplating a business transaction and/or relationship may verify each others' credentials before proceeding. According to some embodiments, these authentication services would be compatible with FAST.

For purposes of authentication a database could be maintained. This database could be secure with its contents encrypted. In certain embodiments, each item in the database could be stored in a DRM container.

As noted above, during entity registration certain data relating to identity, credit worthiness, and like may be collected. According to embodiments of the invention, this data may be stored in the database. At certain intervals, this data could be re-collected from entities to ensure that the database remains up-to-date. Additionally, the database could contain certain data elements that are frequently updated automatically. Such automatically updated data could include personal credit ratings, Better Business Bureau ratings, and company stock price. The database could additionally include calculations based on its data items. For example, the database could include entries relating to the computed stock volatility of corporate entities.

Authentication could take place by the exchange of e-mail messages carrying content. In certain embodiments the content thereof could be placed inside a DRM container and sent as an attachment to that e-mail. In such embodiments, the DRM-V software could ask the party sending the message to indicate what security attributes would have to be met by the recipient. For example, the sender could specify that a retinal scan would be required. In some embodiments, the software could automatically make such decisions concerning security attributes without asking the sending user. In certain embodiments, these messages with attachments could be directly received by DRM-V software. However, in order to support the possibility that these messages could be received by a standard e-mail program, the e-mails could contain instructions in plain text stating that the message should be made available to DRM-V software. For purposes of discussion, it will be assumed that messages will be directly received by DRM-V software.

A method of using such a database and such e-mails to perform authentication according to one embodiment of the present invention will now be described by way of example.

Suppose that one or more of two entities considering doing business together wish to use the authentication feature of the system prior to doing so. As a first step, an user acting on behalf of one of the entities could select "Authentication" from a menu of the DRM-V software. Let us call this entity "Entity A". The software could respond by asking for the entity with which authentication is to be performed. The software could allow the user to answer the query by entering an alias, web address or e-mail address, or by browsing or searching one of the system directories for the desired target entity. Let us call this target entity "Entity B". The DRM-V software could then send an e-mail message to a user corresponding to Entity B extending an invitation to enter authentication. The invitation would further indicate that Entity A had made the request.

Upon receipt of the invitation, the DRM-V software of Entity B could bring the invitation to the attention of an authorized user, perhaps by flashing a dialog box. The dialog box could display the request and the identity of the requesting entity, and ask the user permission to enter authentication. If the user answered "no", the Entity B's DRM-V software would send an e-mail message to a user corresponding to Entity A stating this fact and the process would end. If the user instead answered "yes", negotiations would begin between the two entities as to which information would be shared (step 601).

Depending on the embodiment, negotiation could take a number of forms. According to one embodiment, negotiation could be manual wherein a user corresponding to a first entity would enter using her respective DRM-V software the informational items her entity desired. Items could refer both to items of "actual data" and to "threshold data". An example of actual data would be an individual's net worth. An example of threshold data would be the Boolean answer to the question of whether or not an individual's net worth was greater than $ 1 million U.S.

The DRM-V software could send an e-mail message indicating the desired information to a user corresponding to Entity B. At the same time a user corresponding to the Entity B would have done the same, with the result that each entity would have received the other entity's request. Upon receipt of the request, the DRM-V software of each entity could present the requested items as a checklist, whereby each respective user could check off those informational items that her entity would be willing to provide. The software could also present a blank space whereby the user could type free-form comments to be read by the other entity such as "I'll let you have item #1 on your list if you let me have item #2 on your list." The DRM-V software of each entity could send the completed checklist to the other user using email. Upon receipt each entity could add or remove items. The exchange of e-mail messages containing checklists could continue until a set of items to exchange had been agreed upon; that is when each list contained only checked items.

In other embodiments, the process could be automatic. According to one scenario, the DRM-V software of each entity could show to its corresponding user to a list of requestable items and a list of offerable items. As above, items could refer both to items of "actual data" and to "threshold data". Next to each item on the requestable items list the user could specify a rank number or the indication "absolutely required". In one embodiment the number could be between 1 and 5 with "5" indicating "most desired" and 1 indicating "least desired". In a similar manner, next to each item on the offerable items list the user could specify a rank number or the indication "will not give". In one embodiment the number could be between 1 and 5 with "5" indicating "most willing to give" and 1 indicating "least willing to give".

For numbered items, the DRM-V programs of each entity could exchange negotiation e-mail messages containing lists of desired items. Upon receipt, the DRM-V software would compare the other entity's request list with its own entity's offer list. Messages could continue to be exchanged between the two programs so that each could attempt to secure for its respective entity as many high ranking items as desired while offering as few low ranking items as possible. The standard algorithm known in the art for doing this could be employed. For cases where one item was listed as "absolutely required" by one entity but "will not give" by the other, the negotiation could stop and the each software program could inform its respective user of the situation.

In yet another embodiment, no negotiation would occur. Instead the system could establish certain information that entities would agree to exchange with each other by fact of registering with the system.

Continuing with our example, let us now assume that either by negotiation or by system rules there is an agreed upon dataset that would be exchanged between Entity A and Entity B. The DRM-V software of each entity would e-mail to the entity's respective clearing bank an indication of what data should be released and the target entity to which it should be forwarded (step 603). As alluded to above this information, like the information of all messages in the authentication process, could be contained in a DRM container openable only by the clearing bank for which it was intended. The message might additionally include a password or the like known only by the sending entity or its respective DRM-V software. Such a password could be used to verify the identity of the sending entity.

Upon receipt of the message, each clearing bank could access the above-described database to fetch the data corresponding to the agreed upon dataset (step 605). In certain cases the requested data would be sent as an e-mail message (likely using a DRM container) to the specified target entity, with or without further processing (step 607). Further processing could be required, for example, if the dataset included threshold data. For example suppose a threshold data item referred to whether or not an entity's net worth was above a certain amount. The clearing bank might receive from the database the actual net worth of the entity, make the threshold calculation, and include in the e-mail to the appropriate entity the result of the calculation but not the actual net worth.

Upon receipt of the message containing the data, each DRM-V program could inform its respective user of the results, perhaps using a dialog box. Thus each entity would be informed of the other's attributes or the overall pass or fail result. Based on the results, each user could decide of behalf of its entity whether or not it wished to proceed with the transaction.

In other embodiments, each user could specify to its respective DRM-V software thresholds for each data item. In such embodiments, the DRM-V software could check the received data against the specified thresholds and inform its user whether or not the authentication had a positive outcome without stating the actual results. In some embodiments such as FAST, this mode of operation could be mandatory to keep facts corresponding to entities more private. In embodiments such as FAST, a group of baseline attributes could be exchanged between clearing banks (one representing each user) upon request by the users, with only an overall pass or fail result communicated directly to the users. In this case, the clearing banks are trust brokers and may guarantee or warranty performance of their respective customer.

EXAMPLE

Healthcare

As noted above, embodiments of the present invention allow for the secure transfer of persistently secure descriptive data using DRM vaults transmitted as e-mail attachments. Such security is particularly important for healthcare companies such as hospitals, physician practices, and insurance companies.

Hospitals, physician practices, and insurance companies often need to send and receive patient records and related information corresponding to claims. For example, a claim for an individual's surgical procedure would likely contain at least a subset of the information found on that individual's confidential medical record.

By employing the present invention, such medical record data may be sent securely, with or without corresponding payment data. Translation engines as described above can enhance compatibility between various claims databases and provide integration for the supply chain. XML compilers as described above can reduce file processing time.

Customer Service

According to another embodiment, customer service provided to users of the system is variable based on customer attributes such as profitability.

For example, a self-service eLearning wizard tool could be one level of support. Such a wizard could be offered under circumstances including but not limited to when the DRMV software is running, perhaps in a self-service environment, on an ATM, telematics device or POS device.

According to this functionality, for example, a user could be introduced to the system and guided through the steps of sending and/or receiving funds and/or descriptive data.

An executable diagnostic tool sent by the customer service department to a user via email that provides automatic diagnostic results back to the customer service desk could be another level of support. Telephone 800# service desk support could be a higher level of support and a personal customer service representative the highest level of support. In each of these cases, the help and/or diagnosis provided may take into account attributes of the user requesting assistance. Such attributes may include the authority imparted to that user by its corresponding entity, how long that user has been working with the system (e.g., if the user is a "new user"), and/or the level of service purchased by that user and/or its corresponding entity.

Hardware and Software

Figure 7:
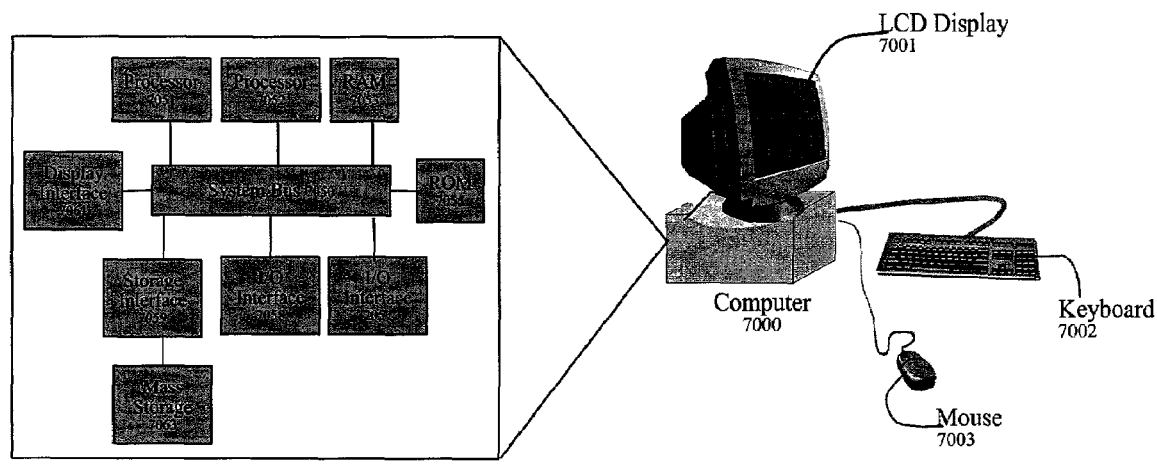
FIG. 7 shows an exemplary general purpose computer which may be used for performing certain aspects of the invention.

As noted above, certain aspects of the present invention may be executed by or with the help of a general purpose computer. The phrases "general purpose computer," "computer," and the like, as used herein, refer but are not limited to an engineering workstation, PC, Macintosh, PDA, web-enabled cellular phone and the like running an operating system such as OS X, Linux, Windows CE, Windows XP, Symbian OS, or the like. The phrases "General purpose computer," "computer," and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 7000 as shown in FIG. 7 includes system bus 7050 which operatively connects two processors 7051 and 7052, random access memory (RAM) 7053, read-only memory (ROM) 7055, input output (I/O) interfaces 7057 and 7058, storage interface 7059, and display interface 7061. Storage interface 7059 in turn connects to mass storage 7063. Each of I/O interfaces 7057 and 7058 may be an Ethernet, IEEE 1394, IEEE 802.11, or other interface such as is known in the art. Mass storage 7063 may be a hard drive, optical disk, or the like. Processors 7057 and 7058 may each be a commonly known processor such as an IBM or Motorola PowerPC or an Intel Pentium.

Computer 7000 as shown in this example also includes an LCD display unit 7001, a keyboard 7002 and a mouse 7003. In alternate embodiments, keyboard 7002 and/or mouse 7003 might be replaced with a pen interface. Computer 7000 may additionally include or be attached to card readers, DVD drives, or floppy disk drives whereby media containing program code may be inserted for the purpose of loading the code onto the computer.

In accordance with the present invention, computer 7000 may be programmed using a language such as Java, Objective C, C, C#, or C++ according to methods known in the art to perform the software operations described above. In certain embodiments DRM containers such as DRM vaults may be implemented using Intertrust Digibox Containers, while the DRM-V software may employ the functionality of an Intertrust InterRights Point.

In certain embodiments, although the message set order protocols and datasets described herein may be closed and proprietary, the application protocol interfaces (APIs) for interfacing with them may be published and provided as open standards.

RAMIFICATIONS AND SCOPE

Although the description above contains many specifics, these are merely provided to illustrate the invention and should not be construed as limitations of the invention's scope. Thus it will be apparent to those skilled, in the art that various modifications and variations can be made in the system and processes of the present invention without departing from the spirit or scope of the invention.

What is claimed is:

1. A method for securely transferring electronic funds comprising:
    (a) creating a computer file containing a digital representation of money;
    (b) assigning, through the use of a computer program resident on a personal computer and without the use of a secure network, at least one sender-defined security attribute to the file containing a digital representation of money, wherein the at least one security attribute precludes unauthorized access to the file containing the digital representation of money, and wherein the at least one sender-defined security attribute is defined at the time of an electronic fund transfer;
    (c) attaching the file containing a digital representation of money to an electronic mail message; and
    (d) transmitting the electronic mail message with attached file containing a digital representation of money over an insecure network to a recipient,
    wherein the at least one security attribute is requirement that the recipient of the file containing a digital representation of money prove they are the intended recipient through either a random number generator card, smart card, or biometric scan comprised of a retina scan, fingerprint, or voiceprint, and
    wherein a clearing bank receives a request that the file containing the digital representation of money be transmitted.

2. The method of claim 1, wherein the clearing bank further receives an electronic mail message requesting receipt of the actual funds corresponding to said digital representation of money.

3. The method of claim 1, wherein the file containing the digital representation of money relies on a security system which is based on an open standard cryptographic method.

4. The method of claim 1, further comprising:
    employing a message set order protocol and dataset that are proprietary; and
    publishing the application protocol interfaces corresponding to said message set and set dataset as an open standard.

5. The method of claim 1, further comprising the step of accessing a database of synergistic services.

6. The method of claim 1, further comprising the step of accessing a database directory of users' profiles and attributes.

7. The method of claim 1, further comprising the step of accessing a database of aliases of users.

8. The method of claim 1, further comprising the step of accessing a database of pending transactions.

9. The method of claim 1, further comprising the step of accessing a database for validation services.

10. The method of claim 1, further comprising the step of accessing a database of eCheck numbers.

11. The method of claim 1, further comprising the step of accessing a database of user authorities.

12. The method of claim 1, further comprising the step of accessing a database for auditing services.

13. The method of claim 1, further comprising the step of accessing a database of ERP data.

14. The method of claim 13, wherein said database of ERP data secures its data pervasively using digital rights management.

15. The method of claim 1, further comprising the step of utilizing XML compilers to speed up transaction rates and data processing speeds for ERP enabled messages.

16. The method of claim 1, further comprising providing a diagnostic help wizard for customer service.

17. The method of claim 1, further comprising providing an ERP help wizard for aiding in ERP data access.

18. The method of claim 1, further comprising providing an email based self-executing software diagnostic tool.

19. The method of claim 1, further comprising providing customer service.

20. The method of claim 1, further comprising providing a tutorial help wizard.

21. The method of claim 1, further comprising the step of performing settlement using a bank payment system.

22. The method of claim 1, further comprising the step of performing settlement using an ATM POS system.

23. The method of claim 1, further comprising the step of interfacing with a currency exchange service provider.

24. The method of claim 1, wherein said steps are performed in an automated manner.

25. The method of claim 1, further comprising generating messages to transfer to a conventional bank the funds corresponding to said electronic representation of cash.

26. The method of claim 1, further comprising the step of providing on-line, real-time access for official government research.

27. The method of claim 26 wherein said government research is econometric research.

28. The method of claim 26 wherein said government research is law enforcement research.

29. The method of claim 1, further comprising the step of placing time-based limitations on the validity of said digital representation of money.

30. The method of claim 1, further comprising the step of providing real-time transfer of the funds corresponding to said digital representation of money.

31. The method of claim 1, further comprising the step of allowing a user requesting said transmission to select the authentication method to be used to access said digital representation of money.

32. The method of claim 1, further comprising the step of allowing establishment of subordinate users who may have similar or lesser authorities than a primary user.

33. The method of claim 1, further comprising the step of requiring a user requesting the transmission of the electronic mail message with attached file containing the digital representation of money to select that a standard privacy matrix template be used to access and said digital representation of money.

34. The method of claim 1, further comprising the step of screening said electronic mail message for viruses or other malicious code.

35. The method of claim 1, further comprising the step of protecting users from spam, denial of service attacks or other malicious interference.

* * * * *

UNITED STATES PATENT AND TRADEMARK OFFICE
CERTIFICATE OF CORRECTION

| | | |
|---|---|---|
| PATENT NO. | : 7,343,349 B2 | Page 1 of 1 |
| APPLICATION NO. | : 09/981358 | |
| DATED | : March 11, 2008 | |
| INVENTOR(S) | : Stephen Lange Ranzini, Chris J. Weideman and Don L. Jacobs | |

It is certified that error appears in the above-identified patent and that said Letters Patent is hereby corrected as shown below:

On the title page, under (75) Inventors, delete "Weiderman" and insert --Weideman--.

In Column 2, line 19, please delete "finds" and insert --funds--.

Signed and Sealed this

Eighth Day of July, 2008

JON W. DUDAS
*Director of the United States Patent and Trademark Office*